(12) United States Patent
Huang et al.

(10) Patent No.: US 9,256,265 B2
(45) Date of Patent: Feb. 9, 2016

(54) METHOD AND SYSTEM FOR ARTIFICIALLY AND DYNAMICALLY LIMITING THE FRAMERATE OF A GRAPHICS PROCESSING UNIT

(75) Inventors: Jensen Huang, Los Altos Hills, CA (US); Franck Diard, Mountain View, CA (US); Scott Saulters, Taipei (TW)

(73) Assignee: NVIDIA CORPORATION, Santa Clara, CA (US)

( * ) Notice: Subject to any disclaimer, the term of this patent is extended or adjusted under 35 U.S.C. 154(b) by 901 days.

(21) Appl. No.: 12/650,207

(22) Filed: Dec. 30, 2009

(65) Prior Publication Data

US 2011/0157191 A1    Jun. 30, 2011

(51) Int. Cl.
| | |
|---|---|
| G06F 3/038 | (2013.01) |
| G09G 5/00 | (2006.01) |
| G06F 15/16 | (2006.01) |
| G06F 13/372 | (2006.01) |
| G09G 3/36 | (2006.01) |
| G09G 5/36 | (2006.01) |
| G09G 5/393 | (2006.01) |
| G06F 3/14 | (2006.01) |
| G06T 1/20 | (2006.01) |
| G06T 15/00 | (2011.01) |
| G06F 1/32 | (2006.01) |

(52) U.S. Cl.
CPC ................................. G06F 1/3203 (2013.01)

(58) Field of Classification Search
CPC ................. G09G 2330/021; G09G 2330/02; G09G 3/3696; G09G 5/363; G09G 5/393; G06T 1/20; G06T 15/005; G06F 3/14

USPC ............................. 50/204–215; 345/204–215
See application file for complete search history.

(56) References Cited

U.S. PATENT DOCUMENTS

| | | | |
|---|---|---|---|
| 4,335,445 | A | 6/1982 | Nercessian |
| 4,544,910 | A | 10/1985 | Hoberman |
| 4,679,130 | A | 7/1987 | Moscovici |

(Continued)

FOREIGN PATENT DOCUMENTS

| | | |
|---|---|---|
| EP | 0381021 | 8/1990 |
| EP | 0474963 | 3/1992 |

(Continued)

OTHER PUBLICATIONS

Shephard et al., Developer's Guide to 3D Visualization in ArcGIS 9.2, Mar. 22, 2007, 2007 Developer Summit, pp. 1,2, & 62.*

(Continued)

*Primary Examiner* — Matthew D Salvucci

(57) ABSTRACT

Embodiments of the present invention are directed to provide a method and system for applying automatic power conservation techniques in a computing system. Embodiments are described herein that automatically limits the frame rate of an application executing in a discrete graphics processing unit operating off battery or other such exhaustible power source. By automatically limiting the frame rate in certain detected circumstances, the rate of power consumption, and thus, the life of the current charge stored in a battery may be dramatically extended. Another embodiment is also provided which allows for the more effective application of automatic power conservation techniques during detected periods of inactivity by applying a low power state immediately after a last packet of a frame is rendered and displayed.

22 Claims, 4 Drawing Sheets

(56) References Cited

U.S. PATENT DOCUMENTS

| | | |
|---|---|---|
| 4,706,180 A | 11/1987 | Wills |
| 4,739,252 A | 4/1988 | Malaviya et al. |
| 4,868,832 A | 9/1989 | Marrington et al. |
| 4,893,228 A | 1/1990 | Orrick et al. |
| 5,086,501 A | 2/1992 | DeLuca et al. |
| 5,103,110 A | 4/1992 | Housworth et al. |
| 5,167,024 A | 11/1992 | Smith et al. |
| 5,177,431 A | 1/1993 | Smith et al. |
| 5,201,059 A | 4/1993 | Nguyen |
| 5,204,863 A | 4/1993 | Saint-Joigny et al. |
| 5,218,704 A | 6/1993 | Watts, Jr. et al. |
| 5,218,705 A | 6/1993 | DeLuca et al. |
| 5,230,055 A | 7/1993 | Katz et al. |
| 5,239,652 A | 8/1993 | Seibert et al. |
| 5,254,878 A | 10/1993 | Olsen |
| 5,300,831 A | 4/1994 | Pham et al. |
| 5,307,003 A | 4/1994 | Fairbanks et al. |
| 5,337,254 A | 8/1994 | Knee et al. |
| 5,339,445 A | 8/1994 | Gasztonyi |
| 5,350,988 A | 9/1994 | Le |
| 5,396,443 A | 3/1995 | Mese et al. |
| 5,410,278 A | 4/1995 | Itoh et al. |
| 5,422,806 A | 6/1995 | Chen et al. |
| 5,440,520 A | 8/1995 | Schutz et al. |
| 5,446,365 A | 8/1995 | Nomura et al. |
| 5,461,266 A | 10/1995 | Koreeda et al. |
| 5,502,838 A | 3/1996 | Kikinis |
| 5,511,203 A | 4/1996 | Wisor et al. |
| 5,513,152 A | 4/1996 | Cabaniss |
| 5,560,020 A | 9/1996 | Nakatani et al. |
| 5,561,692 A | 10/1996 | Maitland et al. |
| 5,568,103 A | 10/1996 | Nakashima et al. |
| 5,568,350 A | 10/1996 | Brown |
| 5,583,875 A | 12/1996 | Weiss |
| 5,586,308 A | 12/1996 | Hawkins et al. |
| 5,587,672 A | 12/1996 | Ranganathan et al. |
| 5,589,762 A | 12/1996 | Iannuzo |
| 5,590,342 A | 12/1996 | Marisetty |
| 5,592,173 A | 1/1997 | Lau et al. |
| 5,594,360 A | 1/1997 | Wojciechowski |
| 5,630,110 A | 5/1997 | Mote, Jr. |
| 5,648,766 A | 7/1997 | Stengel et al. |
| 5,666,522 A | 9/1997 | Klein |
| 5,675,272 A | 10/1997 | Chu |
| 5,680,359 A | 10/1997 | Jeong |
| 5,682,093 A | 10/1997 | Kivela |
| 5,692,204 A | 11/1997 | Rawson et al. |
| 5,710,929 A | 1/1998 | Fung |
| 5,717,319 A | 2/1998 | Jokinen |
| 5,719,800 A | 2/1998 | Mittal et al. |
| 5,727,208 A | 3/1998 | Brown |
| 5,737,613 A | 4/1998 | Mensch, Jr. |
| 5,742,142 A | 4/1998 | Witt |
| 5,745,375 A | 4/1998 | Reinhardt et al. |
| 5,752,011 A | 5/1998 | Thomas et al. |
| 5,754,869 A | 5/1998 | Holzhammer et al. |
| 5,757,171 A | 5/1998 | Babcock |
| 5,757,172 A | 5/1998 | Hunsdorf et al. |
| 5,760,636 A | 6/1998 | Noble et al. |
| 5,764,110 A | 6/1998 | Ishibashi |
| 5,774,703 A | 6/1998 | Weiss et al. |
| 5,774,704 A | 6/1998 | Williams |
| 5,778,237 A | 7/1998 | Yamamoto et al. |
| 5,787,011 A | 7/1998 | Ko |
| 5,796,313 A | 8/1998 | Eitan |
| 5,812,860 A | 9/1998 | Horden et al. |
| 5,815,724 A | 9/1998 | Mates |
| 5,825,674 A | 10/1998 | Jackson |
| 5,825,972 A | 10/1998 | Brown |
| 5,847,552 A | 12/1998 | Brown |
| 5,848,281 A | 12/1998 | Smalley et al. |
| 5,864,225 A | 1/1999 | Bryson |
| 5,884,049 A | 3/1999 | Atkinson |
| 5,884,068 A | 3/1999 | Conary et al. |
| 5,894,577 A | 4/1999 | MacDonald et al. |
| 5,913,067 A | 6/1999 | Klein |
| 5,923,545 A | 7/1999 | Nguyen |
| 5,926,394 A | 7/1999 | Nguyen et al. |
| 5,933,649 A | 8/1999 | Lim et al. |
| 5,940,785 A | 8/1999 | Georgiou et al. |
| 5,940,786 A | 8/1999 | Steeby |
| 5,952,798 A | 9/1999 | Jones et al. |
| 5,974,557 A | 10/1999 | Thomas et al. |
| 5,977,763 A | 11/1999 | Loughmiller et al. |
| 5,978,926 A | 11/1999 | Ries et al. |
| 5,991,883 A | 11/1999 | Atkinson |
| 5,996,083 A | 11/1999 | Gupta et al. |
| 5,996,084 A | 11/1999 | Watts |
| 6,002,409 A | 12/1999 | Harkin |
| 6,005,904 A | 12/1999 | Knapp et al. |
| 6,011,403 A | 1/2000 | Gillette |
| 6,023,776 A | 2/2000 | Ozaki |
| 6,025,737 A | 2/2000 | Patel et al. |
| 6,035,357 A | 3/2000 | Sakaki |
| 6,035,407 A | 3/2000 | Gebara et al. |
| 6,040,668 A | 3/2000 | Huynh et al. |
| 6,047,248 A | 4/2000 | Georgiou et al. |
| 6,065,126 A | 5/2000 | Tran et al. |
| 6,065,131 A | 5/2000 | Andrews et al. |
| 6,076,171 A | 6/2000 | Kawata |
| 6,124,732 A | 9/2000 | Zilic et al. |
| 6,134,167 A | 10/2000 | Atkinson |
| 6,141,762 A | 10/2000 | Nicol et al. |
| 6,163,583 A | 12/2000 | Lin et al. |
| 6,167,524 A | 12/2000 | Goodnow et al. |
| 6,167,529 A | 12/2000 | Dalvi |
| 6,172,943 B1 | 1/2001 | Yuzuki |
| 6,208,350 B1 | 3/2001 | Herrera |
| 6,212,645 B1 | 4/2001 | Tjandrasuwita |
| 6,216,234 B1 | 4/2001 | Sager et al. |
| 6,219,795 B1 | 4/2001 | Klein |
| 6,229,747 B1 | 5/2001 | Cho et al. |
| 6,242,936 B1 | 6/2001 | Ho et al. |
| 6,243,656 B1 | 6/2001 | Arai et al. |
| 6,255,974 B1 | 7/2001 | Morizio et al. |
| 6,304,824 B1 | 10/2001 | Bausch et al. |
| 6,310,912 B1 | 10/2001 | Maiocchi et al. |
| 6,311,287 B1 | 10/2001 | Dischler et al. |
| 6,360,327 B1 | 3/2002 | Hobson |
| 6,363,490 B1 | 3/2002 | Senyk |
| 6,366,157 B1 | 4/2002 | Abdesselem et al. |
| 6,369,557 B1 | 4/2002 | Agiman |
| 6,407,571 B1 | 6/2002 | Furuya et al. |
| 6,415,388 B1 | 7/2002 | Browning et al. |
| 6,422,746 B1 | 7/2002 | Weiss et al. |
| 6,425,086 B1 | 7/2002 | Clark et al. |
| 6,426,641 B1 | 7/2002 | Koch et al. |
| 6,448,815 B1 | 9/2002 | Talbot et al. |
| 6,456,049 B2 | 9/2002 | Tsuji |
| 6,457,134 B1 | 9/2002 | Lemke et al. |
| 6,470,289 B1 | 10/2002 | Peters et al. |
| 6,476,632 B1 | 11/2002 | La Rosa et al. |
| 6,484,041 B1 | 11/2002 | Aho et al. |
| 6,489,796 B2 | 12/2002 | Tomishima |
| 6,510,525 B1 | 1/2003 | Nookala et al. |
| 6,535,424 B2 | 3/2003 | Le et al. |
| 6,535,986 B1 | 3/2003 | Rosno et al. |
| 6,549,243 B1 | 4/2003 | Takashimizu et al. |
| 6,549,802 B2 | 4/2003 | Thornton |
| 6,574,739 B1 | 6/2003 | Kung et al. |
| 6,600,575 B1 | 7/2003 | Kohara |
| 6,621,242 B2 | 9/2003 | Huang et al. |
| 6,630,754 B1 | 10/2003 | Pippin |
| 6,636,976 B1 | 10/2003 | Grochowski et al. |
| 6,650,074 B1 | 11/2003 | Vyssotski et al. |
| 6,650,740 B1 | 11/2003 | Adamczyk et al. |
| 6,657,504 B1 | 12/2003 | Deal et al. |
| 6,662,775 B2 | 12/2003 | Hauser |
| 6,665,802 B1 | 12/2003 | Ober |
| 6,668,346 B1 | 12/2003 | Schulz et al. |
| 6,674,587 B2 | 1/2004 | Chhabra et al. |
| 6,678,831 B1 | 1/2004 | Mustafa et al. |
| 6,690,219 B2 | 2/2004 | Chuang |
| 6,691,236 B1 | 2/2004 | Atkinson |

(56) References Cited

U.S. PATENT DOCUMENTS

| | | | |
|---|---|---|---|
| 6,703,803 B2 | 3/2004 | Ohiwa et al. |
| 6,714,891 B2 | 3/2004 | Dendinger |
| 6,718,496 B1 | 4/2004 | Fukuhisa et al. |
| 6,721,892 B1 | 4/2004 | Osborn et al. |
| 6,737,860 B2 | 5/2004 | Hsu et al. |
| 6,748,408 B1 | 6/2004 | Bredin et al. |
| 6,768,659 B2 | 7/2004 | Gillingham et al. |
| 6,774,587 B2 | 8/2004 | Makaran et al. |
| 6,792,379 B2 | 9/2004 | Ando |
| 6,794,836 B2 | 9/2004 | Strothmann et al. |
| 6,795,075 B1 | 9/2004 | Streitenberger et al. |
| 6,795,927 B1 | 9/2004 | Altmejd et al. |
| 6,799,134 B2 | 9/2004 | Borchers et al. |
| 6,801,004 B2 | 10/2004 | Frankel et al. |
| 6,804,131 B2 | 10/2004 | Galbiati et al. |
| 6,806,673 B2 | 10/2004 | Ho |
| 6,815,938 B2 | 11/2004 | Horimoto |
| 6,815,971 B2 | 11/2004 | Wang et al. |
| 6,831,448 B2 | 12/2004 | Ishii et al. |
| 6,836,849 B2 | 12/2004 | Brock et al. |
| 6,837,063 B1 | 1/2005 | Hood, III et al. |
| 6,853,259 B2 | 2/2005 | Norman et al. |
| 6,853,569 B2 | 2/2005 | Cheng et al. |
| 6,885,233 B2 | 4/2005 | Huard et al. |
| 6,889,331 B2 | 5/2005 | Soerensen et al. |
| 6,889,332 B2 | 5/2005 | Helms et al. |
| 6,907,535 B2 | 6/2005 | Fang |
| 6,910,139 B2 | 6/2005 | Ishidera |
| 6,914,492 B2 | 7/2005 | Hui et al. |
| 6,938,176 B1 | 8/2005 | Alben et al. |
| 6,947,865 B1 | 9/2005 | Mimberg et al. |
| 6,970,798 B1 | 11/2005 | Cao et al. |
| 6,975,087 B1 | 12/2005 | Crabill et al. |
| 6,976,112 B2 | 12/2005 | Franke et al. |
| 6,987,370 B2 | 1/2006 | Chheda et al. |
| 6,990,594 B2 | 1/2006 | Kim |
| 7,003,421 B1 | 2/2006 | Allen, III et al. |
| 7,005,894 B2 | 2/2006 | Weder |
| 7,042,296 B2 | 5/2006 | Hui et al. |
| 7,043,649 B2 | 5/2006 | Terrell, II |
| 7,045,993 B1 | 5/2006 | Tomiyoshi |
| 7,051,215 B2 | 5/2006 | Zimmer et al. |
| 7,068,557 B2 | 6/2006 | Norman et al. |
| 7,071,640 B2 | 7/2006 | Kurosawa et al. |
| 7,100,013 B1 | 8/2006 | de Waal |
| 7,100,061 B2 | 8/2006 | Halepete et al. |
| 7,112,978 B1 | 9/2006 | Koniaris et al. |
| 7,119,522 B1 | 10/2006 | Tomiyoshi |
| 7,122,978 B2 | 10/2006 | Nakanishi et al. |
| 7,129,745 B2 | 10/2006 | Lewis et al. |
| 7,149,909 B2 | 12/2006 | Cui et al. |
| 7,180,322 B1 | 2/2007 | Koniaris et al. |
| 7,256,571 B1 | 8/2007 | Mimberg et al. |
| 7,256,788 B1* | 8/2007 | Luu et al. ............... 345/501 |
| 7,334,198 B2 | 2/2008 | Ditzel et al. |
| 7,336,090 B1 | 2/2008 | Koniaris et al. |
| 7,336,092 B1 | 2/2008 | Koniaris et al. |
| 7,348,827 B2 | 3/2008 | Rahim et al. |
| 7,348,836 B1 | 3/2008 | Velmurugan |
| 7,363,176 B2 | 4/2008 | Patel et al. |
| 7,409,570 B2 | 8/2008 | Suzuoki |
| 7,414,450 B2 | 8/2008 | Luo et al. |
| 7,490,256 B2 | 2/2009 | Marshall et al. |
| 7,509,504 B1 | 3/2009 | Koniaris et al. |
| 7,574,613 B2 | 8/2009 | Holle et al. |
| 7,634,668 B2 | 12/2009 | White et al. |
| 7,725,749 B2 | 5/2010 | Mitarai |
| 7,739,531 B1 | 6/2010 | Krishnan |
| 7,849,332 B1 | 12/2010 | Alben et al. |
| 7,882,369 B1 | 2/2011 | Kelleher et al. |
| 7,886,164 B1 | 2/2011 | Alben et al. |
| 8,370,663 B2 | 2/2013 | Frid et al. |
| 8,762,761 B2 | 6/2014 | Zheng et al. |
| 8,775,843 B2 | 7/2014 | Frid et al. |
| 8,839,006 B2 | 9/2014 | Li et al. |
| 2001/0033504 A1 | 10/2001 | Galbiati et al. |
| 2001/0040584 A1 | 11/2001 | Deleeuw |
| 2001/0044909 A1 | 11/2001 | Oh et al. |
| 2001/0045779 A1 | 11/2001 | Lee et al. |
| 2002/0002689 A1 | 1/2002 | Yeh |
| 2002/0004912 A1 | 1/2002 | Fung |
| 2002/0026597 A1 | 2/2002 | Dai et al. |
| 2002/0029352 A1 | 3/2002 | Borkar et al. |
| 2002/0029374 A1 | 3/2002 | Moore |
| 2002/0032829 A1 | 3/2002 | Dalrymple |
| 2002/0049920 A1 | 4/2002 | Staiger |
| 2002/0073348 A1 | 6/2002 | Tani |
| 2002/0083356 A1 | 6/2002 | Dai |
| 2002/0087896 A1 | 7/2002 | Cline et al. |
| 2002/0099964 A1 | 7/2002 | Zdravkovic |
| 2002/0101257 A1 | 8/2002 | Kawahara et al. |
| 2002/0113622 A1 | 8/2002 | Tang |
| 2002/0116650 A1 | 8/2002 | Halepete et al. |
| 2002/0138778 A1 | 9/2002 | Cole et al. |
| 2002/0178390 A1 | 11/2002 | Lee |
| 2002/0194509 A1 | 12/2002 | Plante et al. |
| 2003/0036876 A1 | 2/2003 | Fuller, III et al. |
| 2003/0065960 A1 | 4/2003 | Rusu et al. |
| 2003/0074591 A1 | 4/2003 | McClendon et al. |
| 2003/0079151 A1 | 4/2003 | Bohrer et al. |
| 2003/0110423 A1 | 6/2003 | Helms et al. |
| 2003/0133621 A1 | 7/2003 | Fujii et al. |
| 2003/0189465 A1 | 10/2003 | Abadeer et al. |
| 2003/0210271 A1 | 11/2003 | King |
| 2004/0025061 A1 | 2/2004 | Lawrence |
| 2004/0032414 A1 | 2/2004 | Jain et al. |
| 2004/0073821 A1 | 4/2004 | Naveh et al. |
| 2004/0105237 A1 | 6/2004 | Hoover et al. |
| 2004/0105327 A1 | 6/2004 | Tanno |
| 2004/0123170 A1 | 6/2004 | Tschanz et al. |
| 2004/0123172 A1 | 6/2004 | Sheller |
| 2004/0128631 A1 | 7/2004 | Ditzel et al. |
| 2004/0215779 A1 | 10/2004 | Weber |
| 2005/0007047 A1 | 1/2005 | Strothmann et al. |
| 2005/0068311 A1* | 3/2005 | Fletcher et al. ............... 345/211 |
| 2005/0071705 A1 | 3/2005 | Bruno et al. |
| 2005/0218871 A1 | 10/2005 | Kang et al. |
| 2005/0249382 A1* | 11/2005 | Schwab et al. ............... 382/115 |
| 2005/0268141 A1 | 12/2005 | Alben et al. |
| 2005/0268189 A1 | 12/2005 | Soltis |
| 2005/0289367 A1 | 12/2005 | Clark et al. |
| 2006/0074576 A1 | 4/2006 | Patel et al. |
| 2006/0174277 A1 | 8/2006 | Sezan et al. |
| 2007/0179940 A1 | 8/2007 | Robinson et al. |
| 2007/0220289 A1 | 9/2007 | Holle et al. |
| 2007/0229054 A1 | 10/2007 | Dobberpuhl et al. |
| 2007/0234088 A1 | 10/2007 | Marshall et al. |
| 2007/0257710 A1 | 11/2007 | Mari et al. |
| 2007/0296440 A1 | 12/2007 | Takamiya et al. |
| 2008/0055318 A1* | 3/2008 | Glen ............... 345/501 |
| 2008/0143372 A1 | 6/2008 | Koniaris et al. |
| 2008/0275533 A1* | 11/2008 | Deshpande ............... 370/392 |
| 2009/0072885 A1 | 3/2009 | Kawasaki |
| 2010/0216524 A1 | 8/2010 | Thomas et al. |
| 2010/0318828 A1 | 12/2010 | Elting et al. |
| 2011/0264946 A1 | 10/2011 | Goodemote et al. |
| 2011/0283130 A1 | 11/2011 | Pai et al. |

FOREIGN PATENT DOCUMENTS

| | | |
|---|---|---|
| EP | 0501655 | 9/1992 |
| EP | 0632360 | 1/1995 |
| EP | 0794481 | 7/1997 |
| EP | 0978781 | 2/2000 |
| EP | 0991191 | 4/2000 |
| EP | 1096360 | 5/2001 |
| EP | 1182538 | 2/2002 |
| EP | 1182556 | 2/2002 |
| EP | 1398639 | 3/2004 |
| GB | 2342471 | 4/2000 |
| GB | 2393540 | 3/2004 |
| GB | 2404792 | 2/2005 |
| JP | H07129277 | 5/1995 |
| JP | 10187300 | 7/1998 |

(56) References Cited

FOREIGN PATENT DOCUMENTS

| | | |
|---|---|---|
| JP | 2000284862 | 10/2000 |
| JP | 3076234 | 3/2001 |
| JP | 2003122459 | 4/2003 |
| JP | 2003195981 | 7/2003 |
| WO | 0127728 | 4/2001 |
| WO | 03079171 | 9/2003 |

OTHER PUBLICATIONS

Lorch, J.R. et al.: Software Strategies for Portable Computer Energy Management: IEEE Personal Communications, IEEE, Communications Society, US vol. 5, No. 3 Jun. 1, 1997, pp. 60-73, XP000765376 ISSN: 1070-9916 the whole document.

Melear, C.: Hardware and Software Techniques for Power Conservation in Portable Devices: Wescon Conference IEEE Center, Hoes Lane, US Sep. 27, 1994, pp. 453-461, XP000532610 ISSN: 1044-6036, the whole document.

Dubois, Y.A. et al.: ASIC Design Considerations for Power Management in Laptop Computers: Euro ASIC 91 Paris, France May 27-31, 1991, Los Alamitos, CA USA, IEEE Comput. Soc. US, pp. 348-351, XP010024394 ISBN: 0-8186-2185-0, the whole document.

"Computer Software", Wikipedia, http://en.wikipedia.org/wiki/software, retrieved May 2, 2007.

"High Speed, Digitally Adjusted Stepdown Controllers for Notebook CPUS", Maxim Manual, pp. 11 & 21.

Alben, et al.; A Processor Speed Adjustment System and Method; U.S. Appl. No. 10/449,942, filed May 30, 2003.

Alben, et al.; A Processor Voltage Adjustment System and Method; U.S. Appl. No. 10/448,891, filed May 30, 2003.

Baker, K. et al.; "Wafer Burn-In Isolation Circuit" IBM Technical Disclosure Bulletin, IBM Corp., New York, US, vol. 32, No. 6B, Nov. 1, 1989, pp. 442-443, XP00073858 ISSN: 0018-8689.

Baker, K. et al.; 'Shmoo Plotting: The Black Art of IC Testing, IEEE Design and Test of Computers, IEEE vol. 14, No. 3; Jul. 1, 1997; pp. 90-97; XP000793305 ISSNL 0740-7475.

Calavert, J.B., "The Phase-Locked Loop", Jul. 24, 2001, http://www.du.edu/.about.etuttle/electron/elect12.htm.

Grishman, Ralph; Lecture Notes, "Computer System Design-Spring 2002", "Lecture 2: Combinational Logic Design", 2002, Department of Computer Science, New York University.

Kelleher, et al.; A Processor Performance Adjustment System and Method; U.S. Appl. No. 10/295,619, filed Nov. 14, 2002.

Migdal, et al.; "A Processor Temperature and ODE Adjustment System and Method", U.S. Appl. No. 10/295,748, filed Nov. 14, 2002.

Oner, H et al.; "A Compact Monitoring Circuit for Real-Time-On-Chip Diagnosis of Hot-Carrier Induced Degradation". Microelectronics Test Structures, 1997. ICMTS 1997. Proceedings, IEEE International Conference on Monterey, CA May 17, 1993-May 20, 1997, pp. 72-76.

Govil, K. et al.; "Comparing Algorithms for Dynamic Speed-Setting of a Low-Power PCU"; International Computer Science Institute; Berkeley, CA; Apr. 1995.

Mobile Pentium.RTM. III Processors-Thermal Management, http://support.intel.com/support/processors/mobile/pentiumiii/thermal.htm—, Sep. 12, 2002, pp. 1-4.

Hong, I. et al.; Power Optimization of Variable Voltag Core Based Systems; Jun. 1998; Design Automation Conference Proceedings.

Hong, I. et al.; Synthesis Techniques for Low-Power Hard Real-Time Systems on Variable Voltage Processors; Real-Time System Symposium Proceedings. Dec. 1998.

Intel, Intel Pentium 4 Processor in the 423-pin Package, pp. 78-80, (Date believed prior to Nov. 14, 2002).

Mobile Pentium.RTM. III Processors-Thermal Diode, http://support.intel.com/support/processors/mobile/pentiumiii/diode.htm, Sep. 12, 2002, pp. 1-2.

Mobile Pentium.RTM. III Processors-Enhanced Intel.RTM. SpeedStep.TM. Technology, http://support.intel.com/support/processors/mobile/pentiumiii/tti004.htm, Sep. 12, 2002, pp. 1-4.

* cited by examiner

Exemplary Computer System 400

METHOD AND SYSTEM FOR ARTIFICIALLY AND DYNAMICALLY LIMITING THE FRAMERATE OF A GRAPHICS PROCESSING UNIT

BACKGROUND

A graphics processing unit or "GPU" is a device used to perform graphics rendering operations in modern computing systems such as desktops, notebooks, and video game consoles, etc. Traditionally, graphics processing units are typically supplied as either of two general classes of processing units: integrated units or discrete video cards.

Integrated graphics processing units are graphics processors that utilize a portion of a computer's system memory rather than having its own dedicated memory. Due to this arrangement, integrated GPUs are typically localized in close proximity to, if not disposed directly upon, some portion of the main circuit board (e.g., a motherboard) of the computing system. Integrated GPUs are, in general, cheaper to implement than discrete GPUs, but are typically lower in capability and operate at reduced performance levels relative to discrete GPUs.

Discrete or "dedicated" GPUs are distinguishable from integrated GPUs by having local memory dedicated for use by the GPU which they do not share with the underlying computer system. Commonly, discrete GPUs are implemented on discrete circuit boards called "video cards" which include, among other components, a GPU, the local memory, communication buses and various output terminals. These video cards typically interface with the main circuit board of a computing system through a standardized expansion slot such as PCI Express (PCIe) or Accelerated Graphics Port (AGP), upon which the video card may be mounted. In general, discrete GPUs are capable of significantly higher performance levels relative to integrated GPUs. However, discrete GPUs also typically require their own separate power inputs, and require higher capacity power supply units to function properly. Consequently, discrete GPUs also have higher rates of power consumption relative to integrated graphics solutions. In software that have higher graphical needs (e.g., advanced gaming applications), the relative power consumption is also naturally higher relative to less graphics intensive application.

Some modern main circuit boards often include an integrated graphics processing unit as well as one or more additional expansion slots available to add a dedicated graphics unit. Each GPU can and typically does have its own output terminals with one or more ports corresponding to one or more audio/visual standards (e.g., VGA, HDMI, DVI, etc.), though typically only one of the GPUs will be running in the computing system at any one time. Alternatively, other modern computing systems can include a main circuit board capable of simultaneously utilizing two identical dedicated graphics units to generate output for one or more displays.

Some notebook and laptop computers have been manufactured to include two or more graphics processors. Notebook and laptop computers with more than one graphics processing units are almost invariably solutions featuring an integrated GPU and a discrete GPU. Unlike configurations common to desktop computers however, due to size and weight constraints, the discrete graphics processors in mobile computing systems may be non-standardized, and specific to the laptop or notebook's particular make or model. Furthermore, unlike desktop computers featuring multiple graphics processors, typical mobile computing systems with an integrated GPU and a discrete GPU will share the same output terminals. For example, a common configuration is to have the integrated GPU directly coupled to the display device and the discrete GPU coupled to the integrated GPU (but not the display device). When the discrete GPU is used, data is transferred first to the integrated GPU through system memory and eventually to the display device through the integrated GPU.

According to conventional configurations, each of the graphics processing units may have specific (and possibly disparate) performance capabilities. These capabilities may be expressed as a plurality of characteristics that shape and configure the graphical output of the GPU as it is displayed by the display device. In a typical embodiment, these characteristics may include, but are not limited to, the resolution, refresh rate, brightness, and color depth of the output as displayed along with any power conservation features that are available. Generally, these characteristics are conveyed to the operating system executing on the computing system, whereupon they may be visible and configurable by a user of the computing system. Typically, a system with both a discrete and integrated GPUs will have only one of the graphics processing units (or class of units) alternatively selected by the user (or application) to provide exclusive graphics rendering and output for the system.

Unfortunately, typical graphics processing units are ill-equipped or unable to adjust to fluctuating power demands. As a result, the rates of power consumption may not be easily manipulated to suit a user's preferences. Even when available, typical power consumption management must be generally performed manually, and, even when automated, only limited features are typically available to be managed (e.g., the brightness of a display device, system sleep intervals, etc.) This problem is of particular concern in situations where a user is operating a graphics intensive application from an relatively inexhaustible power source (such as a wall outlet operating on alternating current) which becomes unavailable, due to an energy blackout, or travel, etc. In such circumstances, the user must terminate the application or operate off the exhaustible DC power source, which may face significant risks (such as loss of progress or unsaved data) if the power source is depleted or fails unexpectedly.

SUMMARY

Embodiments of the present invention are directed to provide a method and system for applying automatic power conservation techniques in a computing system. Embodiments are described herein that automatically limits the frame rate of an application executing in a discrete graphics processing unit operating off battery or other such exhaustible power source. By automatically limiting the frame rate in certain detected circumstances, the rate of power consumption, and thus, the life of the current charge stored in a battery may be dramatically extended. Another embodiment is also provided which allows for the more effective application of automatic power conservation techniques during detected periods of inactivity by applying a low power state immediately after a last packet of a frame is rendered and displayed.

One novel embodiment monitors the power source, operating graphics processing unit, and frame rate of a current executing environment. When the state of the power source is determined to have changed (e.g., from an AC power source to a DC power source), the frame rate may be automatically and artificially limited below a pre-determined threshold if the current operating graphics processing unit is also determined to be the discrete graphics processing unit. According to some embodiments, the desired frame rate may be adjusted by the user according to preference, such as a user-accessible registry key.

Another embodiment monitors the sequence of data packets arriving in a frame buffer of an operating graphics processing unit. When the last data packet of a current frame is rendered and produced, the graphics processing unit will automatically and immediately enter a low power state until the first packet of the next frame is received.

Each of the above described novel methods and system feature the ability to provide lowered rates of power consumption in situations where a power source may be limited. In short, a system's battery performance is more effectively and automatically extended based on prevailing circumstances.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
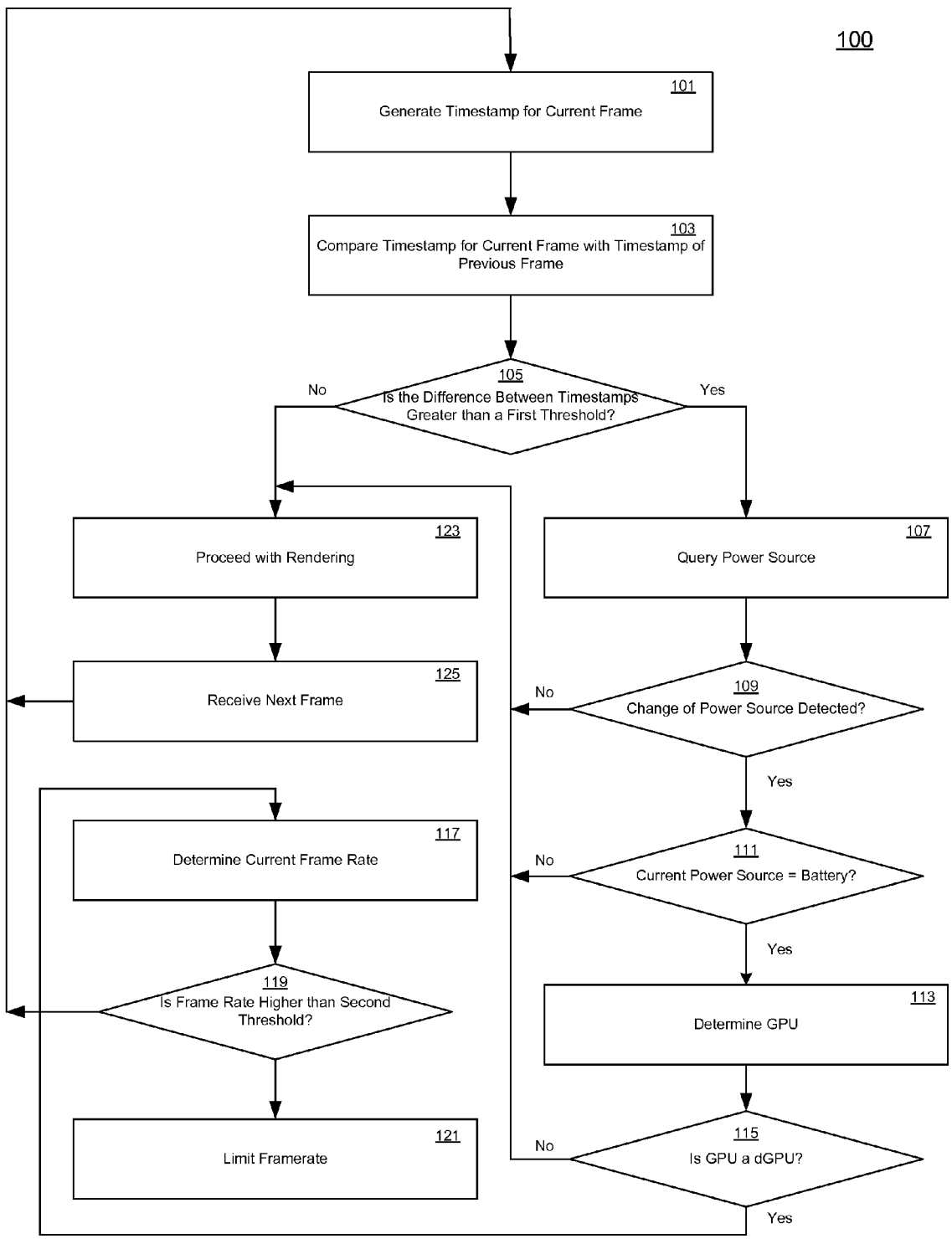
FIG. 1 depicts a flowchart of an exemplary method for automatically limiting the frame rate of an application executing under specifically determined conditions, in accordance with embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known processes, procedures, components, and circuits have not been described in detail as not to unnecessarily obscure aspects and features of the subject matter.

Portions of the detailed description that follow are presented and discussed in terms of a process. Although steps and sequencing thereof are disclosed in figures herein (e.g., FIGS. 1 and 2) describing the operations of this process, such steps and sequencing are exemplary. Embodiments are well suited to performing various other steps or variations of the steps recited in the flowchart of the figure herein, that not all of the steps depicted may be performed, or that the steps may be performed in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Automatically Limiting Frame Rate

According to embodiments of the claimed subject matter, a method is provided for extending battery life in a computing system including multiple graphics processing units. In typical embodiments, a user of the computing system may thus elect one of the graphics processing units to render the graphical output, corresponding to data produced by the computing system, which is then presented in a display device. In a typical embodiment, each of the graphics processing units interacts with the computing system through a driver running on and/or in conjunction with an operating system executing on the computing system and each graphics driver has a specific, corresponding driver which communicates with the GPU through a bus in the computing system.

In one embodiment, in a notebook computing system having both an integrated GPU as well as a discrete GPU that share the same output terminals, a user is able to select a particular GPU to use, e.g., to perform a certain task or under specific circumstances. For example, when executing relatively light graphics intensive applications, such as typical word processing software, the user may prefer lower power consumption and an extended battery life, and may opt to use the more energy efficient graphics processing units (e.g., the integrated GPU). Conversely, at some other time the user may prefer to achieve higher graphics performance (e.g., 3-D gaming applications), and may switch to the graphics processing unit (e.g., the discrete GPU) capable of higher performance.

In general, a user's graphical experience is improved when the graphics processing unit is able to render and produce images at higher frequency rates. The rate of the produced and displayed images (or "frames") is often referred to as the "frame rate," and can vary wildly between system to system, application to application, and even sequence to sequence within a single application as graphics requirements fluctuate. A higher frame rate is generally preferred and it is typical for the operating graphics processing unit to produce and display at the highest frame rate of which the GPU is capable. Naturally, producing at higher frame rates adds to the rate of power consumption during the system's operation. When the computer system or device is powered by a (generally) inexhaustible power source, such as a wall outlet, the rate of power consumption may not be an issue (energy costs notwithstanding). These power sources typically comprise a power source of alternating current (AC). However, for easily exhaustible power sources and sources with a depleting charge, such as batteries, the high rates of power consumption due to higher frame rates may become an issue. Batteries and like temporary charged power sources typically operate off direct current (DC).

As presented in FIG. 1, a flowchart of an exemplary method 100 for automatically limiting the frame rate of an application executing under specifically determined conditions is depicted, in accordance with embodiments of the present invention. Steps 101-125 describe exemplary steps comprising the method 100 in accordance with the various embodiments herein described.

During a typical graphics rendering process, data in the form of rendering instructions is provided to a graphics processing unit from an application executing in the operating system via a central processing unit or similar central microprocessor. According to some embodiments, these instructions may be communicated across various software component layers. These rendering instructions may, for example, be provided as byte code that defines the specific operations requested of the graphics processing unit. According to some aspects, the rendering instructions are stored in buffers (e.g., command buffers) by the driver of the graphics processing unit that is to perform the operations specified in the instructions. Once a command buffer is full, additional command buffers may be dynamically created by the driver of the GPU for additional storage. In typical embodiments, the instructions for a single frame may be collected and rendered together. In further embodiments, the instructions may be stored until all of the instructions comprising a single frame is collected or the command buffer is full, whereupon a command or request (by the application, for example) to "present" the rendered output for the frame is communicated to GPU. This present request is received by the driver of the GPU, which then communicates or "commits" the instructions in the command buffer(s) to the GPU for rendering. Once the instructions are received by the GPU from its command buffer and rendering is performed, the frame may be transmitted to the display device for display. In typical embodiments, the instructions are retrieved from the command buffer(s) and rendered by the GPU as quickly as possible. According to some configurations, the discrete GPU may not be coupled to the display device. Instead, an integrated GPU may be coupled to, and act as an intermediary between, both the discrete GPU and the display device. According to these embodiments, the discrete GPU may copy the rendered image data into system memory, which is then transferred to the integrated GPU before being passed through to the display device.

At step 101 of the method 100, a timestamp corresponding to a current frame is generated by a graphics processing unit for the current frame. In one embodiment, the timestamp is generated once a present call for the frame is received by the driver of the GPU, typically when all of the rendering instructions for the frame have been received in the command buffer. In some embodiments, the present request may occur even when a command buffer is not full. According to one aspect, the power source currently providing power to the system is periodically polled (e.g., at preset intervals) to determine the power state (e.g., off, operating, low power mode) and the type or class corresponding to the source of the power. In some embodiments, the power source may be polled according to the pre-set intervals and the data reflecting the currently operating power source may be delivered along with a present call. In alternate embodiments, the power state is a power state event periodically distributed at regular, pre-determined intervals by the operating system to system components. According to such embodiments, polling the power source may not be required, and steps 101 through 105 may be omitted in an alternate embodiment of process 100.

At step 103, the timestamp generated in step 101 is compared to a pre-stored timestamp generated of a previous frame which corresponds to the most recent power source query. In one embodiment, the difference between the timestamp of the current frame generated at step 101 and the timestamp corresponding to the most recent power source query reflects the time elapsed between the respective time stamps. At step 105, the time elapsed between the timestamp generated for the current frame and the timestamp generated corresponding to the last power source query is compared to a pre-determined threshold (e.g., ten seconds, etc.) If the time elapsed is greater than the pre-determined threshold, the process 100 continues on to step 107. Otherwise, the process 100 proceeds directly to step 123.

If sufficient time has elapsed since the most recent power source query is determined at step 105 (e.g., the difference between the timestamp of the current frame and the timestamp corresponding to the most recent power source query is greater than the pre-determined threshold), the current power source of the system is queried at step 107. Querying the current power source of the system may comprise, for example, determining the type of power source currently being used by the computer system to supply power (e.g., an AC power source or a DC power source). The current power source determined at step 107 is compared to the recorded power source at the time of the most recent power source query to detect a change of power source at step 109. Thus, for example. a change from an AC power source to a DC power source (and vice versa) may be detected at step 109. More specifically, a change in power source between a relatively unlimited power source and a readily exhaustible (or otherwise limited) power source may be detected at step 109. If a change in power source is detected at step 109, the process continues to step 111. Otherwise, the process proceeds directly to step 123.

At step 111, whether the current source of power used by the computer system is a local battery (or other source with limited charge) is determined. Accordingly, if the current power source of the computer system is a local battery is determined at step 111, the process continues to step 113, wherein a power conservation technique by limiting the frame rate of the graphics processing unit will be employed (e.g., steps 117-121). Alternatively, if the power source of the computer system is determined not to be a local battery (and thus, nigh inexhaustible), power conservation may not be a concern, wherein the frame continues to be rendered without further modification (e.g., steps 123 and 125 are performed).

If a change of power source was detected at step 109 of FIG. 1 and the current power source was determined to be a local battery at step 111, the current operating graphics processing unit is determined at step 113. If the current operating graphics processing unit is determined to be an integrated graphics unit, such as when currently executing applications are of low graphics intensity or activity, the process proceeds directly to step 123. Alternatively, if the currently operating graphics processing unit is determined to be the discrete graphics unit, such as is the case when higher graphics performance and/or greater graphics rendering capability is required or preferred, the process continues to step 117.

At step 117, the current frame rate produced by the discrete graphics processing unit (as determined to be the current operating GPU in step 115) is determined. In one embodiment, determining the current frame rate may comprise, for example, summing the number of most recent frames over a unit of time. Summing the number of frames over a unit of time (e.g., a second) may comprise for example, evaluating the timestamps of the most recent presented frames and determining the number of frames presented for a unit of time. As in the above example, the frames per second may be derived from summing the number of frames presented with timestamps corresponding to, and within, the last second of time.

At step 119, the frame rate determined at step 117 is compared to a second threshold reflecting the desired frame rate to provide power-conservation. In one embodiment, the second threshold may comprise a stored user-configured value, such as a registry key. At step 121, the frame rate of the discrete GPU currently operating on battery power (as determined in steps 111 and 115) is limited to the second threshold value (or below). In one embodiment, limiting the frame rate may comprise stalling the command thread of the dGPU. Stalling the command thread of the dGPU, meanwhile, may be performed by artificially inhibiting (e.g., delaying) the transfer rate of byte code comprising the plurality of rendering instructions or commands of a frame to the command buffer of the GPU to a frequency at or below the second threshold. In other embodiments, the frame rate may be limited by delaying the present command from being communicated to the GPU in the driver of the GPU to a frequency at or below the second threshold. Since, according to typical embodiments, the GPU will retrieve the instructions and perform rendering as quickly as it is capable of, delaying the delivery of the rendering commands and/or the present call to a frequency at or below the second threshold will artificially limit the frame rate of the output of the dGPU to a rate that does not exceed the user-configurable, second threshold.

In still further embodiments, a reduction in power consumption rates may be extended even further by putting the entire graphics rendering process into a sleep state at step 121, thereby inducing multiple system components of the computing system into operating at a reduced power state while the process itself is in a sleep state. The aggregate effect of the plurality of system components operating in a reduced power state can reduce the overall system power consumption significantly, and beyond that of merely limiting the power consumption rate of the GPU.

According to one embodiment if the above conditions are met, that is, if a change in power source from an alternating current power source to a direct current power source is detected, and the currently operating graphics processing unit is determined to be the discrete GPU, the frame rate is automatically limited without input from the user of the computing system.

At step 123, the conditions for artificially limiting the frame rate according to steps 107-115 have not been determined. As such, the normal operation of producing and displaying graphical output is maintained absent further modification, and the next frame in the sequence of frames may be received at step 125.

According to some embodiments, certain computing systems may provide a feature referred to as "vertical synchronization" or "v-sync," wherein the generated frame rate of a GPU conforms to the refresh rate of the display device. For example, a display device such as a monitor may have a refresh rate (configurable by the user in some instances) of 60 hertz a second. In such configurations, the frame rate of any output produced by the operating GPU may be limited to 60 frames per second. Accordingly, the process 100 described above may not be compatible with computer systems in which the v-sync feature is being used.

Automatically Applying Power-Conservation
Techniques Between Frames

Certain conventional implementations of computing devices offer power conservation features that reduce the consumption of power by reducing the power state or "mode" of the computing device after periods of inactivity. One or more modes may be available with increasingly reduced levels of power consumption. Common modes are referred to (separately) as "sleep" and "hibernate." Reduced power states for computing systems are achieved by disabling certain operations or features (e.g., wireless networking, display brightness). Recently, implementations of graphics processing units capable of achieving a power state with reduced power consumption have been made available. According to a typical implementation, the graphics processing unit will reduce its power state after a detected period of inactivity. For example, once the graphics processing unit has received a present request for a frame and completed rendering and delivery of the frame, the GPU will enter a low activity level (sometimes referred to as "ELPG mode") with a correspondingly lower rate of power consumption after a period of uninterrupted inactivity is detected. Typically, normal activity level is returned once data corresponding to the next frame is received in the command buffer of the GPU and/or once the instructions stored in the command buffer are communicated to the graphics processing unit by the driver of the GPU.

Figure 2:
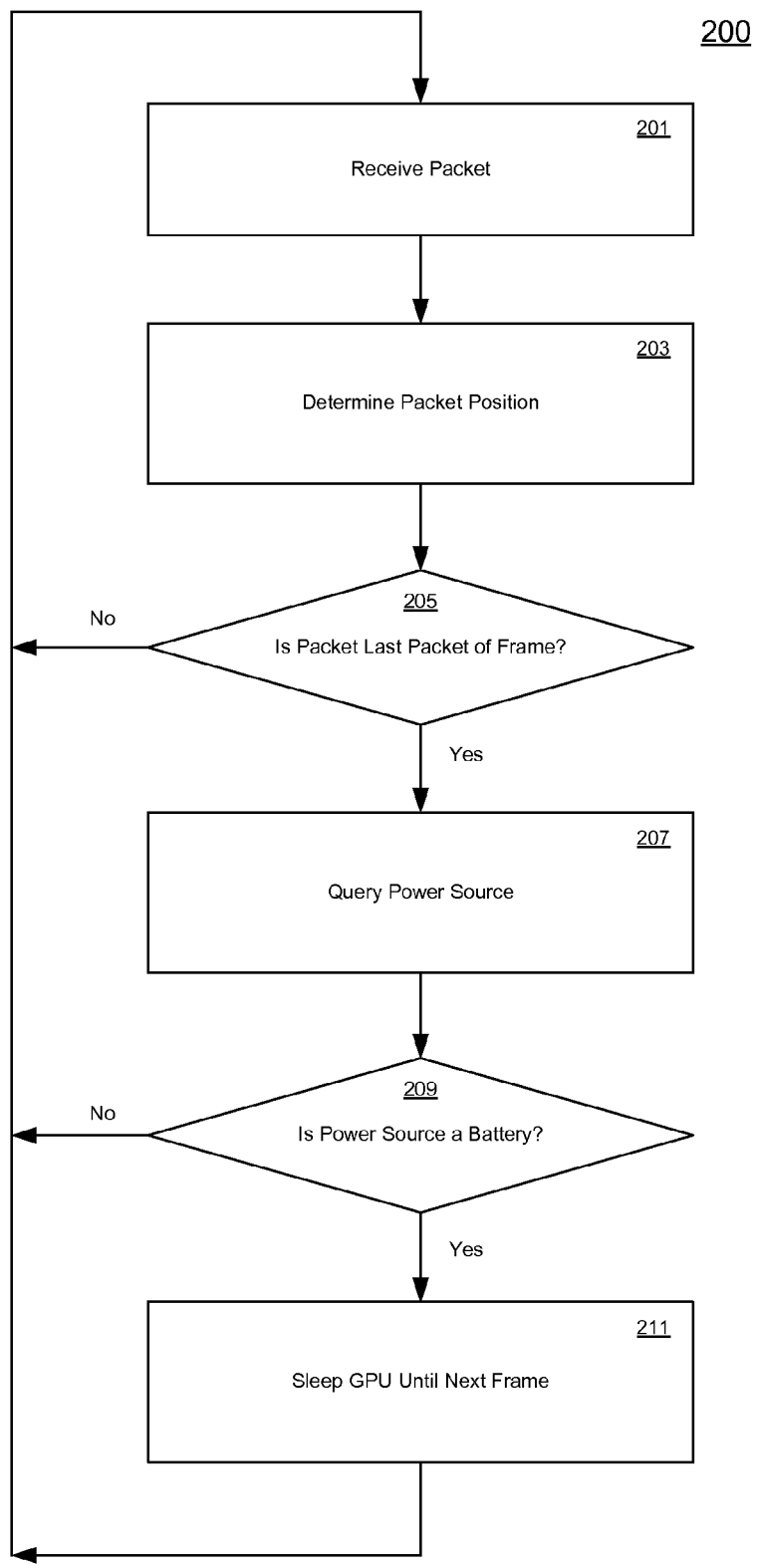
FIG. 2 depicts a flowchart of an exemplary method to immediately apply automatic power-conservation techniques between frames, in accordance with embodiments of the present invention.

As presented in FIG. 2, flowchart of an exemplary method 200 to immediately apply automatic power-conservation techniques between frames is depicted, in accordance with embodiments of the present invention. Accordingly, the duration wherein the GPU is persisting in a lower power state is extended relative to conventional techniques, thereby providing power-conservation with greater efficacy. Steps 201-211 describe exemplary steps comprising the method 200 in accordance with the various embodiments herein described.

At step 201, a data packet of a plurality of packets corresponding to instructions for performing graphics operations is received in a command buffer corresponding to a discrete GPU. In one embodiment, the command buffer may be created by the driver of the GPU in, for example, graphics memory coupled to the GPU. At step 203, the relative position of the packet received in step 201 in the plurality of packets is determined. In one embodiment, the packet position determined at step 203 is compared to a packet delivery schedule for the frame to determine if the packet is the final packet corresponding to instructions for rendering the frame at step 205. In alternate embodiments, the last packet of every frame may be pre-identified. For example, the last packet of the frame may include a flagged bit or tag which identifies the packet as the last packet of instructions for a frame. Determining whether a packet is the last packet may therefore consist of detecting the presence of the flag/identifier. If the packet is determined in step 205 to be the last (or a flagged) packet of the frame, the process 200 continues to step 207. Otherwise, if the packet is determined in step 205 not to be the final or flagged packet of the frame, the process 200 is repeated for the next received packet, beginning at step 201.

If, however, the packet received at step 201 is determined in steps 203-205 to be the last (or flagged) packet or other data unit comprising the plurality of graphics processing instructions for rendering a frame, the current power source of the computing system is queried at step 207. Querying the current power source of the computing system may be performed according to step 107 described above with respect to FIG. 1. At step 209, whether the power source is a battery or power source with an exhaustible or limited charge (e.g., a DC power source) is determined. If the power source is determined at step 209 to be of limited charge, the process 200 continues to step 211. Otherwise, if an AC power source is detected, the process 200 is repeated for the next received packet, beginning at step 201. In some embodiments, steps 207 and 209 may be performed periodically and outside of the performance of process 200 (e.g., the current power source is known during the performance of process 200.

At step 211, the GPU achieves a reduced power state immediately once the packet received in step 201 is determined to be the last packet or a flagged packet of the current frame in steps 203-205 if the currently operating graphics processing unit is determined to be the discrete GPU (which may be already known or determined in steps 207-209). Unlike conventional power-saving techniques that will achieve reduced power states after periods of inactivity exceeding a threshold, embodiments of the presently claimed subject matter will achieve the reduced power state immediately, thereby extending the duration wherein the GPU is operating in a reduced power state and achieving a more effective reduction in power consumption. In one embodiment, a pre-determined packet delivery schedule is referenced to determine the duration of time between an estimated presentation of the last packet of a current frame and the arrival of the first packet of the immediately subsequent frame. In further embodiments, the driver will delay the delivery of graphics processing instructions for the next frame so as to artificially reduce the frame rate of the graphical output as well as increasing the time between frames, thereby inducing even greater durations of the reduced power state. According to such embodiments, the reduced power state persists for this entire duration of time.

Exemplary Representations Of Usage And Power Consumption

Figure 3A:
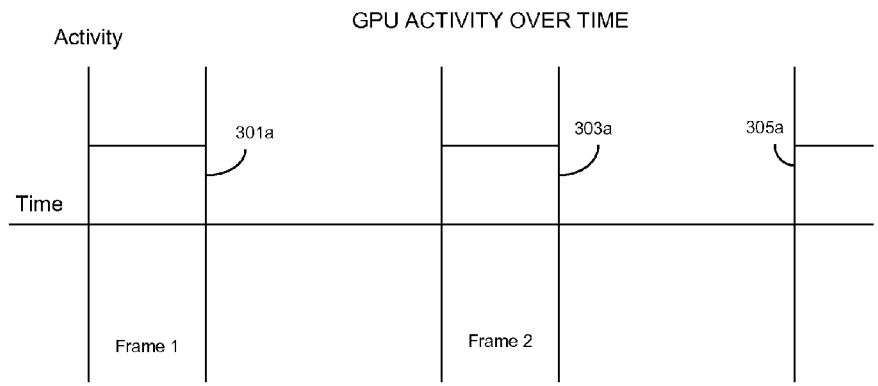
FIG. 3A depicts an exemplary graph of GPU activity over time for an exemplary sequence of rendered frames, in accordance with embodiments of the present invention.

With reference now to FIG. 3A, an exemplary graph of GPU activity over time for an exemplary sequence of rendered frames is depicted, in accordance with embodiments of the present invention. As displayed in FIG. 3A, the activity experienced and/or performed in a graphics processing unit corresponds to the rendering of frames of graphical output. As presented, the periods of time corresponding to the rendering performed for frames (e.g., Frame1, Frame2) coincide with increased activity experienced by the GPU (e.g., activity levels 301a, 303a, 305a). When the GPU is not actively performing graphics processing operations, (e.g., pixel rendering), its activity is naturally reduced as a result. Thus, delaying the scheduling of instructions or commands to the GPU may achieve significant reduction in power consumption.

Figure 3B:
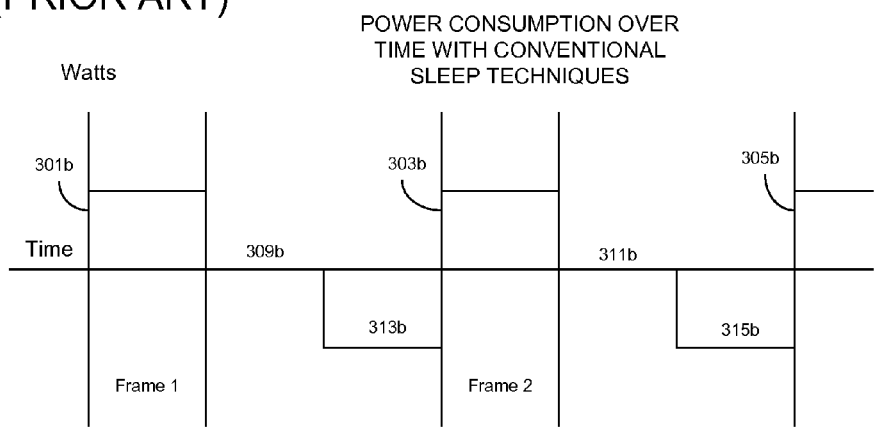
FIG. 3B depicts a graph of power consumption over time according to conventional power management techniques.

FIG. 3B depicts a graph of power consumption over time according to conventional power management techniques. When the GPU is not actively performing graphics processing operations, (e.g., pixel rendering), the power consumption of the GPU is likewise reduced in concert with the periods of inactivity as the transistors comprising the GPU are not all in operation. As presented, the rates of power consumption corresponding to the rendering performed for frames (e.g., Frame1, Frame2) coincide with increased activity experienced by the GPU (e.g., activity levels 301b, 303b, 305b). Under conventional power-management techniques, once a frame has finished rendering, the GPU may maintain its normal power state until activity increases or until the period of inactivity (e.g., periods 309b, 311b) match or exceed a threshold, after which the GPU achieves a reduced power state (e.g., reduced power states 313b, 315b).

Figure 3C:
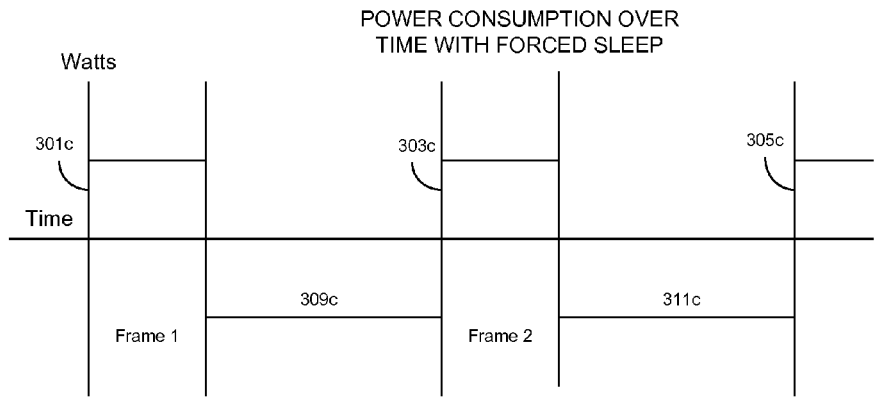
FIG. 3C depicts a graph of power consumption over time, in accordance with embodiments of the present invention.

FIG. 3C depicts a graph of power consumption over time, in accordance with embodiments of the present invention. As presented, the rates of power consumption corresponding to the rendering performed for frames (e.g., Frame1, Frame2) coincide with increased activity experienced by the GPU (e.g., activity levels 301b, 303b, 305b). However, unlike conventional power-management techniques, the last packet of a frame is monitored, and once rendering for the last packet of a frame is completed, the power state of the GPU is reduced immediately (e.g., reduced power states 309c, 311c), without waiting to exceed a period of inactivity. (e.g., reduced power states 313b, 315b). Accordingly, additional power consumption may be thus achieved.

Exemplary Computing Device

Figure 4:
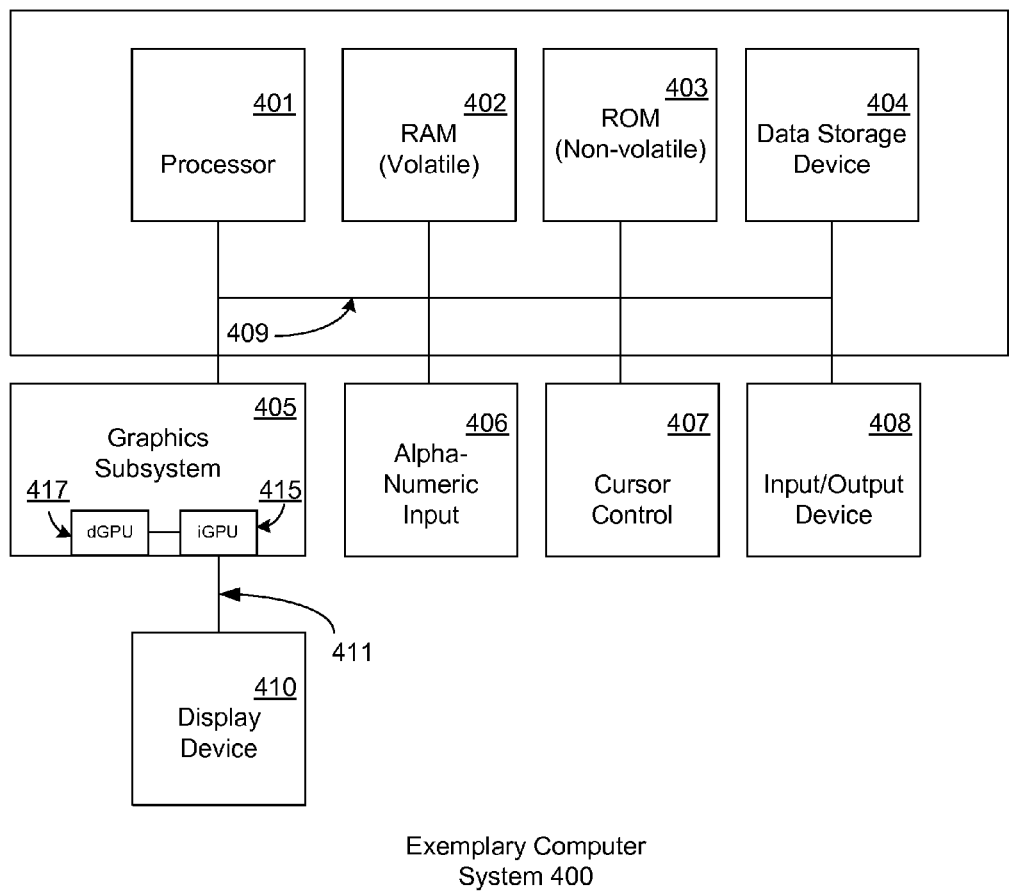
FIG. 4 depicts an exemplary computing environment, in accordance with embodiments of the present invention.

As presented in FIG. 4, an exemplary system upon which embodiments of the present invention may be implemented includes a general purpose computing system environment, such as computing system 400. In its most basic configuration, computing system 400 typically includes at least one processing unit 401 and memory, and an address/data bus 409 (or other interface) for communicating information. Depending on the exact configuration and type of computing system environment, memory may be volatile (such as RAM 402), non-volatile (such as ROM 403, flash memory, etc.) or some combination of the two.

Computer system 400 may also comprise an optional graphics subsystem 405 for presenting information to the computer user, e.g., by displaying information on an attached display device 410, connected by a video cable 411. According to embodiments of the present claimed invention, the graphics subsystem 405 may include an integrated graphics processing unit (e.g., iGPU 415) coupled directly to the display device 410 through the video cable 411 and also coupled to a discrete graphics processing unit (e.g., dGPU 417). According to some embodiments, rendered image data may be communicated directly between the graphics processing units (e.g., iGPU 415 and dGPU 417) via a communication bus 409 (e.g., a PCI-e interface). Alternatively, information may be copied directly into system memory (RAM 402) to and from the graphics processing units (e.g., iGPU 415 and dGPU 417) also through the communication bus 409. In alternate embodiments, display device 410 may be integrated into the computing system (e.g., a laptop or netbook display panel) and will not require a video cable 411. In one embodiment, the processes 100 and 200 may be performed, in whole or in part, by graphics subsystem 405 in conjunction with the processor 401 and memory 402, with any resulting output displayed in attached display device 410.

Additionally, computing system 400 may also have additional features/functionality. For example, computing system 400 may also include additional storage (removable and/or non-removable) including, but not limited to, magnetic or optical disks or tape. Such additional storage is illustrated in FIG. 4 by data storage device 404. Computer storage media includes volatile and nonvolatile, removable and non-removable media implemented in any method or technology for storage of information such as computer readable instructions, data structures, program modules or other data. RAM 402, ROM 403, and data storage device 404 are all examples of computer storage media.

Computer system 400 also comprises an optional alphanumeric input device 406, an optional cursor control or directing device 407, and one or more signal communication interfaces (input/output devices, e.g., a network interface card) 408. Optional alphanumeric input device 406 can communicate information and command selections to central processor 401. Optional cursor control or directing device 407 is coupled to bus 409 for communicating user input information and command selections to central processor 401. Signal communication interface (input/output device) 408, also coupled to bus 409, can be a serial port. Communication interface 409 may also include wireless communication mechanisms. Using communication interface 409, computer system 400 can be communicatively coupled to other computer systems over a communication network such as the Internet or an intranet (e.g., a local area network), or can receive data (e.g., a digital television signal).

Although the subject matter has been described in language specific to structural features and/or processological acts, it is to be understood that the subject matter defined in the appended claims is not necessarily limited to the specific features or acts described above. Rather, the specific features and acts described above are disclosed as example forms of implementing the claims.

What is claimed is:

1. A method for limiting the frame rate of a graphics processing unit, the method comprising:
in a computer system comprising an integrated graphics processing unit (GPU) and a discrete GPU,
generating a timestamp in response to a rendering being completed for a current frame of a plurality of frames;
comparing the timestamp for the current rendered frame to a timestamp of a previous frame in the plurality of frames corresponding to a most recent power source query to determine if a duration of elapsed time between the respective timestamps exceeds a timing threshold value;
querying a current power source of the computer system to determine if the current power source has changed since the most recent power source query when the timestamp of the previous frame exceeds the timing threshold value;
in the event the current power source has changed since the most recent power source query, determining if the computer system is being powered by a first power source of a plurality of power sources;
in the event the power source comprises the first power source of the plurality of power sources, determining if the discrete GPU is currently in operation; and
automatically limiting a frame rate of the discrete GPU if the frame rate is above a frame rate threshold value in response to a determination that the discrete GPU is currently in operation.

2. The method of claim 1, wherein the frame rate threshold value is user programmable.

3. The method of claim 1, wherein the limiting the frame rate comprises:
determining a current frame rate; and
stalling a command thread of the GPU if the current frame rate is greater than the frame rate threshold.

4. The method of claim 3, wherein the determining a current frame rate comprises calculating the current frame rate from a plurality of collected timestamps corresponding to recent frames of the application.

5. The method of claim 3 wherein the stalling the command thread of the GPU comprises:
inhibiting the transfer of byte code comprising the plurality of commands in a command buffer to the GPU to a frequency that results to a frame rate below the second threshold.

6. The method of claim 3 further comprising putting a graphics rendering process supplying data to be rendered by the integrated GPU or the discrete GPU into a sleep state.

7. The method of claim 1, wherein the first power source comprises a direct current (DC) power source.

8. The method of claim 1, wherein the first power source does not comprise an alternating current (AC) power source.

9. The method of claim 1, wherein a vertical synchronization feature is not in operation for the computer system.

10. The method of claim 1, wherein the determining if the discrete GPU is currently in operation comprises maintaining a framerate in the integrated GPU if the discrete GPU is determined not to be currently in operation.

11. The method of claim 1, wherein the querying a current power source of the computer system to determine if the current power source has changed since a most recent power source query comprises polling the current power source at regular intervals.

12. A system for limiting the frame rate of a graphics processing unit to reduce power consumption comprising:
a plurality of graphics processing units comprising a first graphics processing unit and a second graphics processing unit, for rendering graphical output comprising a plurality of frames and a timestamp generated for each of the plurality of frames;
a display device for displaying graphical output received from a currently operating graphics processing unit of the plurality of graphics processing units;
a central processing unit for distributing a plurality of packets comprising a plurality of rendering instructions to the currently operating graphics processing unit;
a plurality of frame buffers respectively comprised in, and corresponding to, the plurality of graphics processing units for storing a plurality of graphics rendering instructions; and
a plurality of power sources for providing an operating power source to the system, the plurality of power sources comprising a first power source and a second power source;
wherein the plurality of power sources is queried to determine the operating power source when a timestamp between successive frames of the plurality of frames is greater than a timing threshold by comparing the timestamp of a current frame of the plurality of frames to a timestamp of a previous frame of the plurality of frames corresponding to a most recent power source query to determine if a duration of elapsed time between the respective timestamps exceeds a timing threshold value,
further wherein, in response to detecting a change in the operating power source from the first power source to the second power source, the currently operating graphics processing unit is determined, and a frame rate of the second graphics processing unit is artificially limited to a threshold value if the second graphics processing unit is determined to be the currently operating graphics processing unit.

13. The system of claim 12, wherein the first graphics processing unit is an integrated graphics processing unit.

14. The system of claim 12, wherein the second graphics processing unit is a discrete graphics processing unit.

15. The system of claim 12, wherein the first power source comprises a direct current power source.

16. The system of claim 12, wherein the second power source comprises an alternating current power source.

17. The system of claim 12, wherein the frame rate of the seconds graphics processing unit is limited by delaying a distribution of the plurality of graphics rendering packets from the central processing unit to the second graphics processing unit to achieve a frame rate produced by the second graphics processing unit below the threshold value.

18. A method for reducing the rate of power consumption of a graphics processing unit, the method comprising:
  in a computer system comprising an integrated graphics processing unit (GPU) and a discrete GPU, determining which of the integrated GPU and the discrete GPU is currently in operation,
  in the event a discrete GPU is determined to be currently in operation:
    receiving a packet of a plurality of packets corresponding to a first frame of a second plurality of frames in a discrete GPU, the packet comprising a plurality of rendering instructions;
    determining if the packet is a flagged packet;
    in the event the packet is the flagged packet, determining a type of power source currently supplying power to the computer system; and
    in response to determining the type of power source currently supplying power to the computer system comprises a battery-operated power source, immediately achieving a low power state in the discrete GPU upon the GPU completes rendering data contained in the flagged packet,
  wherein the flagged packet comprises a packet flagged as a last packet in a plurality of packets corresponding to a frame of graphical output,
  further wherein, the determining which of the integrated GPU and the discrete GPU is currently in operation comprises generating a timestamp in response to a rendering being completed for a current frame of a first plurality of frames and comparing the timestamp of the current frame to a timestamp of a previous frame corresponding to a most recent power source query to determine if a duration of elapsed time between the respective timestamps exceeds a timing threshold value.

19. The method of claim 18, wherein the determining if the packet is a flagged packet in the plurality of packets comprises detecting a presence of a flagged packet.

20. The method of claim 18, wherein the immediately achieving a low power state comprises:
  determining an expected duration of time until a packet of the plurality of packets corresponding to a second frame is received according to a schedule;
  operating the discrete GPU in the low power state for the expected duration of time.

21. The method of claim 18, wherein a packet of the plurality of packets is received in a frame buffer of the discrete GPU.

22. The method of claim 21, wherein the first frame comprises graphical output for an application executing on the computer system in full-screen display mode.

* * * * *